Jan. 16, 1962     F. A. KNEIDL ETAL     3,016,705
SELF-PURGING STARTING FUEL NOZZLES FOR GAS TURBINE ENGINES
Filed Aug. 4, 1960     2 Sheets-Sheet 1
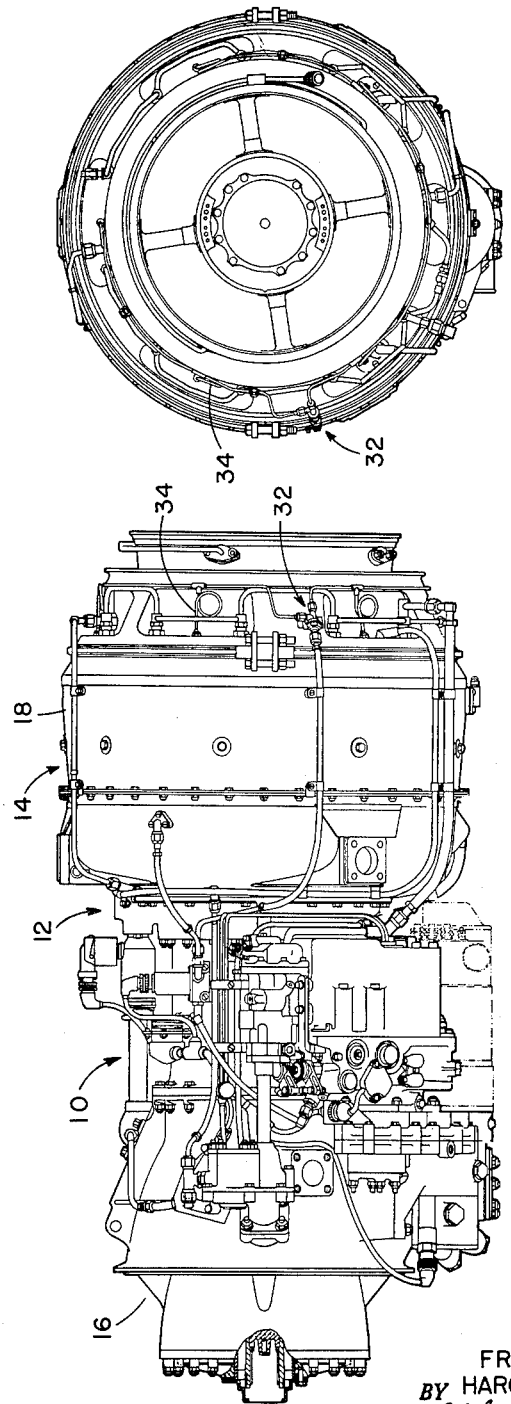
INVENTORS.
FRANZ A. KNEIDL.
BY HAROLD S. BEATTIE.
ATTORNEYS.

Jan. 16, 1962 F. A. KNEIDL ETAL 3,016,705
SELF-PURGING STARTING FUEL NOZZLES FOR GAS TURBINE ENGINES
Filed Aug. 4, 1960 2 Sheets-Sheet 2

INVENTORS.
FRANZ A. KNEIDL.
BY HAROLD S. BEATTIE.
ATTORNEYS.

3,016,705
SELF-PURGING STARTING FUEL NOZZLES FOR GAS TURBINE ENGINES

Franz A. Kneidl, Milford, and Harold G. Beattie, Huntington, Conn., assignors to Avco Corporation, Stratford, Conn., a corporation of Delaware
Filed Aug. 4, 1960, Ser. No. 47,472
3 Claims. (Cl. 60—39.74)

This invention relates to self-purging starting fuel nozzles for gas turbine engines.

It is customary in certain gas turbine engines to provide a plurality of fuel nozzles and means to supply fuel thereto, which are separate from the fuel vaporizer units for supplying fuel during normal operation. Inasmuch as these starting nozzles supply fuel for only a limited time and then become inactive, it is important to purge the nozzles of all fuel, as the failure to do so, because of the high temperatures resulting near the combustion section, would otherwise cause the residual fuel to cake or form deposits with subsequent clogging of the nozzle. One solution of this problem in the past has been to provide a separate purging line to accomplish the purpose by injection of compressed air from a separate source. This, however, adds complication to the mechanism.

It is therefore a primary object of the present invention to provide a self-purging system for these starting fuel nozzles by mechanism taking advantage of pressures existing in the adjacent air passages through which the fuel nozzle extends into the combustion section to provide pressure necessary to purge the starting nozzles.

The above and other objects of the invention will appear more fully from the following more detailed description of an illustrative embodiment of the invention found practical in actual operation and by reference to the accompanying drawings forming a part hereof and wherein:

FIG. 1 is a side view of a gas turbine engine of the type employing the self-purging starting nozzles of this invention.

FIG. 2 is a rear view of the engine (shown in FIG. 1) showing certain of the fuel line parts and their relationship to the engine.

Figure 3:
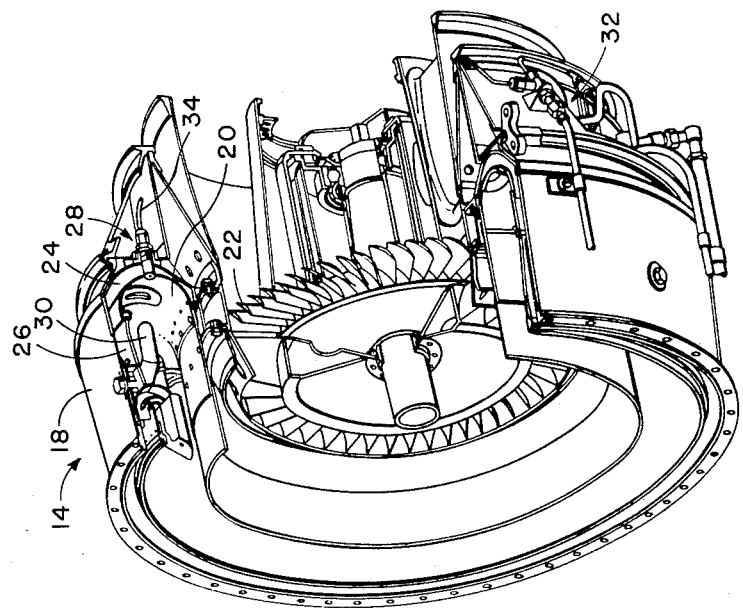
FIG. 3 is a perspective view of a section of the combustion section and the adjacent air passages showing the position of one of the several starting fuel nozzles.
Figure 4:
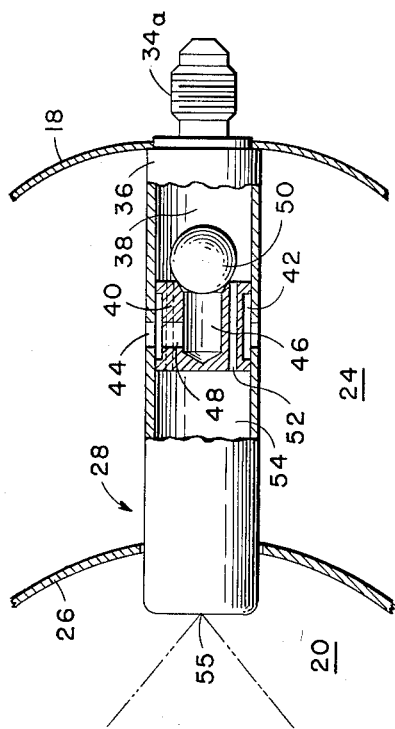
FIG. 4 is a view partly in section showing a starting fuel nozzle with the valve mechanism of this invention.

Referring to the drawings, FIG. 1 shows the gas turbine engine 10 which has a compressor section 12, a combustor and turbine section 14, and an air inlet 16 to the compressor. The combustor and turbine section 14 has a removable rear portion 18 (shown in FIG. 3) in a perspective partly in section. It appears that in the engine shown there is an annular combustor 20 where air and fuel are mixed and burned to drive turbine 22 and another turbine, not shown. The combustor is supplied with compressed air from the compressor section 12 which feeds air under pressure into the air passages 24 surrounding the combustor from which it is fed by various inlet openings in the combustor wall 26 to the combustor 20. During starting the engine fuel is fed to the combustor through plurality of starting fuel nozzles, one of which 28 is shown in FIGS. 3 and 4. Fuel during the operation of the engine is fed by a different system to a plurality of fuel vaporizer units 30. The fuel for supplying the starting nozzles 28, as well as the fuel vaporizer nozzles 30, is provided by a fuel inlet pipe system shown generally at 32 in FIGS. 1 and 2. Fuel pipes 34, feeding the starting nozzles 28, are shown in FIGS. 2 and 3, and such fuel pipes terminate at the individual connections to the fuel nozzles 28 at fuel inlet connection 34a, as shown in FIG. 4. As shown in FIGS. 3 and 4, each of the starting fuel nozzles 28 extend through the wall of the rear portion of the engine 18 through the air passage 24 and through the combustor wall 26 into the combustion space or chamber, here designated as combustor 20. The air passage 24 is supplied with air under pressure from the compressor section 12, and this air in the region where the nozzles 28 extend through is substantially higher than the pressure inside starting nozzles 28 when fuel is not flowing under pressure therethrough.

Referring to FIG. 4, each starting fuel nozzle 28 is formed with a tubular portion or member 36 extending through air passage 24 into combustor 20. A chamber 38 inside tubular portion 36 has a fuel inlet 34 at one end thereof outside the wall of the engine. The chamber 38 is closed at its opposite end by a valve member 40 and has an annular space 42 connected with the air passage 24 by an opening 44. The annular space 42 is also connected to a central opening 46 through a hole 48. The air pressure from the air passage 24 is fed into central opening 46 through the opening 44, the annular portion 42, and the opening 48, all acting as a conduit for air from the surrounding passage to the interior of the tubular portion 36. A ball 50 is provided in the chamber 38 and is of such size as to close the central opening 46 when contact is made with such opening. Fuel in the chamber 38 is normally fed through longitudinal openings 52, which are independent of the air conduit formed by 44, 42, 48 and 46. Fuel normally flowing through the openings 52 is thereby fed into chamber 54 and is sprayed into the combustion chamber 20 therefrom through orifice 55.

When fuel is fed at 34, as in starting operation as controlled by the fuel control of the engine, the ball 50 will be normally in position to close the opening 46 and the pressure of the fuel is such that the ball 50 will stay on its seat and prevent air from entering the interior of nozzle 28 from the chamber 24. However, when the starting cycle is completed and the fuel control turns off the fuel into the starting system and no more fuel is fed into the connections 34a, then the ball 50 will fall from its seat due to the higher air pressure from the chamber 24 which will then feed air into the interior of both chambers 38 and 54, coming through the opening 46 into chamber 38 and through the longitudinal openings 52 to the chamber 54, thus clearing the interior of the entire nozzle 28 of fuel and replacing it with air from the chamber 24. The unit then continues to act as an air conduit merely carrying out a function of supplying air to the combustor 20 along the other openings in the combustor wall 26, but the result is a clearing or purging of the nozzles 28 of starting fuel until such nozzles are again replenished from the connections 34 and 34a on a subsequent starting cycle of the engine. The advantage gained is a purging of the starting fuel nozzles adjacent the combustor, thus preventing coking and clogging of the nozzles, which often results on the heating of retained fuel. This purging action is accomplished by the mechanism disclosed by making use of pressure conditions existing in the engine adjacent the starting nozzles, and such action has sometimes been referred to as "self-purging" and the nozzles generally described as "self-purging starting nozzles."

Although the invention has been described by reference to a specific structure found practical in actual operation, it is not intended that the structure used for illustration will be considered as limiting the scope of the invention but rather that modifications are intended by the substitution of mechanical equivalents within the scope of the following claims.

We claim:

1. A self-purging fuel nozzle for operation with a gas turbine engine having an air passage affording air under pressure adjacent a combustion chamber, said nozzle comprising: a tubular portion extending through said air passage and having a fuel orifice outlet into said combustion chamber, a conduit having an opening to the outside of said tubular portion into said air passage to receive air under pressure from said air passage and extending to an end opening in the interior of said tubular portion, means to feed fuel under pressure through said tubular portion and to said orifice outlet independently of said conduit, a check valve adjacent the end of said conduit interior of said tubular portion and positioned to be actuated by pressure of said fuel to close said conduit during fuel flow and positioned to open said conduit into said tubular portion on reduction of pressure of said fuel on termination of fuel flow thereby affording air passage pressure inside said tubular portion to purge said tubular portion of fuel on reduction of pressure feeding said fuel.

2. A self-purging fuel nozzle for operation with a gas turbine engine having an air passage affording air under pressure adjacent a combustion chamber, said nozzle comprising: a tubular portion extending through said air passage and having a fuel orifice outlet into said combustion chamber, a conduit forming a connecting passage from said air passage to the interior of said tubular portion, a check valve in said conduit operable to be closed on flow of fuel under pressure through said tubular portion and to be opened to feed air under pressure from the said air passage to purge said nozzle of fuel when flow of fuel under pressure ceases.

3. A self-purging fuel nozzle for operation adjacent an air passage of relatively high pressure air, comprising: a tubular portion with air inlet to the interior thereof from outside said tubular portion, a check valve operable to control said air inlet and positioned to be closed by fuel under pressure fed through said nozzle and opened by pressure of air from outside said tubular portion of said nozzle when flow of fuel under pressure ceases, thereby to purge said nozzle of fuel by pressure of air on termination of fuel flow.

References Cited in the file of this patent

UNITED STATES PATENTS

| | | |
|---|---|---|
| 2,712,218 | Ritter | July 5, 1955 |
| 2,953,248 | Troland | Sept. 20, 1960 |